Aug. 24, 1948.  A. G. GRANATH  2,447,575
APPARATUS FOR AERATING GRANULAR MATERIAL
Filed March 12, 1945  3 Sheets-Sheet 1
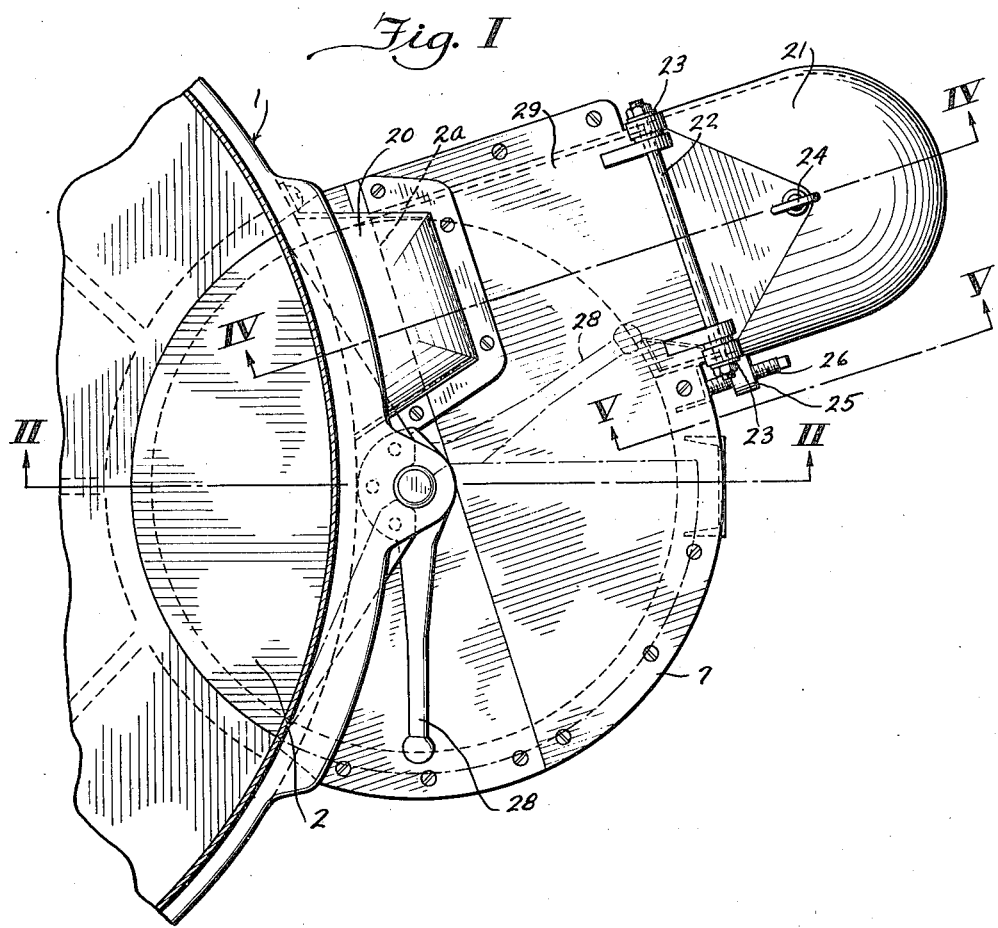
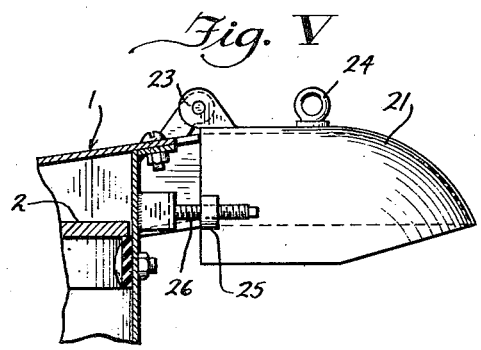
INVENTOR.
Axel G. Granath
BY
The Firm of Charles W. Hills, Attys.

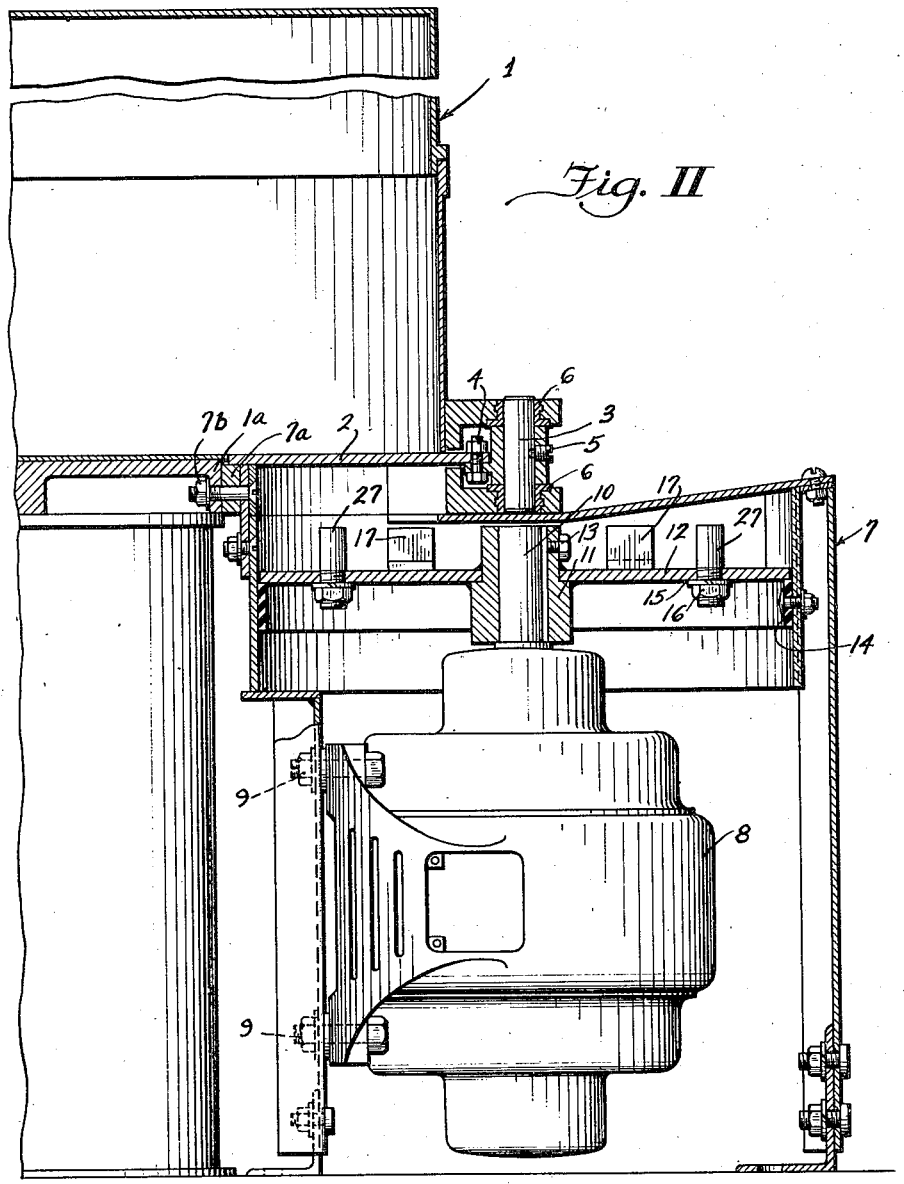

Aug. 24, 1948.　　　A. G. GRANATH　　　2,447,575
APPARATUS FOR AERATING GRANULAR MATERIAL
Filed March 12, 1945　　　3 Sheets-Sheet 3
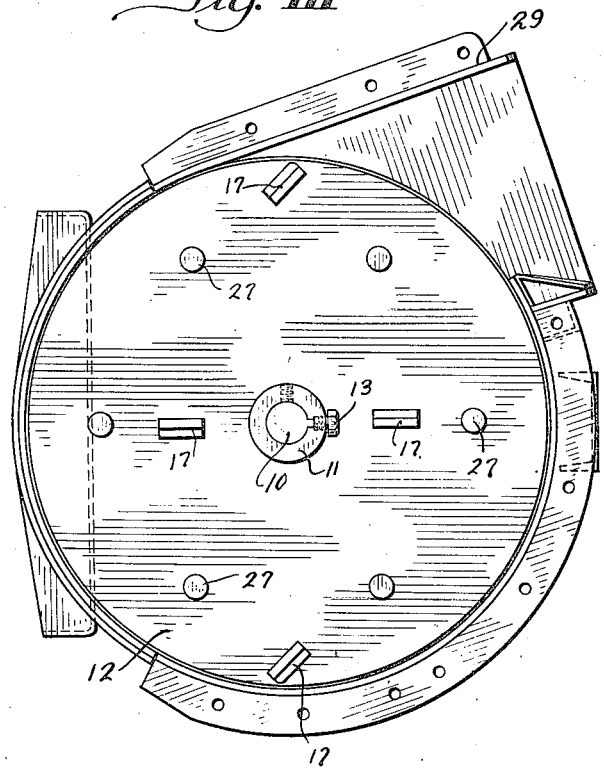
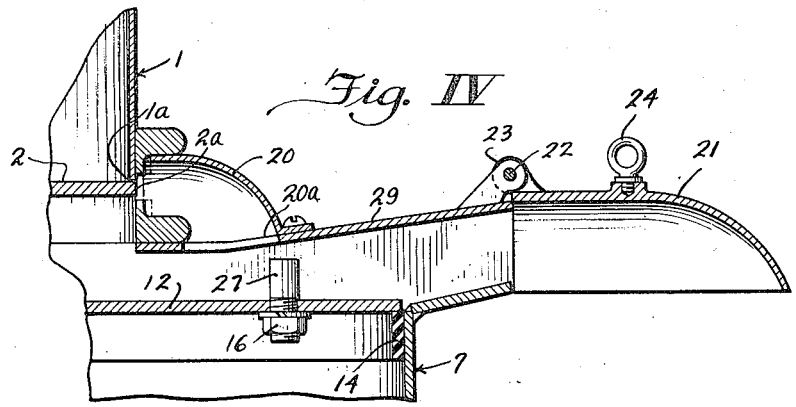
INVENTOR.
Axel G. Granath
BY
The Firm of Charlesworth, Att'ys.

Patented Aug. 24, 1948

2,447,575

UNITED STATES PATENT OFFICE 2,447,575

APPARATUS FOR AERATING GRANULAR MATERIAL

Axel G. Granath, Chicago, Ill., assignor to Herbert S. Simpson, Evanston, Ill.

Application March 12, 1945, Serial No. 582,321

1 Claim. (Cl. 259—1)

The present invention relates to a method and apparatus for aerating granular materials such as sand.

In foundry practice, sand is thoroughly mixed in a muller or mixing machine. The sand is often wet and lumpy as it leaves the muller hence it is desirable to aerate it and make it fluffy by breaking the lumps in order to make it suitable for use such as, for example, in sand cores for making castings.

Accordingly, an object of the present invention is to provide a novel method and apparatus for fluffing and aerating granular material such as sand.

A more specific object of the present invention is to provide a compact apparatus for effectively applying centrifugal force and loosening sand or other granular material as it leaves a mixer in a wet and lumpy state so as to make it fine and fluffy.

In accordance with the general features of this invention there is provided in combination with a muller for treating granular material and having a bottom discharge opening, a material fluffing device having a rotary member substantially parallel to the discharge opening and partially lapping the same and a swingable door for the opening and for controlling the discharge of material from said opening into said rotary member.

Another feature relates to the provision of a novel tangential discharge structure for the fluffing or aerating device and which discharge structure may be employed to direct the material leaving the fluffing device.

Other objects and advantages will become apparent from the following specification taken with the accompanying drawings illustrating, by way of example, one embodiment of the invention wherein:

Figure I is a fragmentary top view of a sand muller or mixer outlet and of a centrifugal aerating device embodying the principles of the present invention;

Figure II is a side view partly in cross section taken along the line II—II of Figure I;

Figure III is a top view of the aerator disc and adjoining housing parts shown in Figures I and II with the housing cover removed;

Figure IV is a fragmentary cross-sectional view taken along line IV—IV of Figure I; and Figure V is a fagmentary view partly in cross section taken along line V—V of Figure I.

Referring more particularly to the drawings, numeral 1 denotes a muller or mixer of any well known type for effecting thorough mixing of granular material such as, for example, sand. The mixed sand is discharged from the mixer through a slidable door 2 having the shape of an arcuate segment and which is rigidly secured to shaft 3 by means of bolts 4 and set screws 5. Shaft 3 is journaled in bearing members 6 affixed to the mixer 1. By means of a handle 28 rigidly secured to shaft 3 the door 2 is pivotally rotated about the axis of shaft 3 to effect opening and closing thereof to respectively discharge or stop discharge of the mixed sand. The door as shown in full lines in Figure I is in the closed position. The dash and dot lines represent the position of the handle and door when in the open position.

An important feature of the present invention is the construction of the aerating device as well as its relative positioning with respect to the mixer 1 to afford compactness. Housing 7 which encloses the aerator is located beneath and overlaps a portion of the bottom of the mixer 1, namely, that portion underlying door 2. Housing 7 is bolted to a downwardly extending flange portion 1a of mixer 1 by means of a tie band 7a and bolts 7b. An electric motor 8 is rigidly secured by means of bolts 9 to the sidewall of housing 7 and is energized by a suitable source of electric power (not shown). Drive shaft 10 of the motor has keyed thereto the hub 11 of a disc 12 which hub is restrained from longitudinal movement by means of set screw 13. A ring or belt 14 of rubber or other suitable sealing material is affixed to housing 7 and underlies the periphery of disc 12 to effect a seal to prevent escape of sand downwardly along the outer peripheral edge of the disc.

A plurality of threaded studs 27 are secured to the upper surface of disc 12 by means of lock washers 15 and bolts 16. Also a plurality of angular pieces of stock or angles 17 are secured to the top surface of disc 12. Studs 27 and angles 17 are provided for the purpose of breaking up lumps of sand as the disc is rotated by motor 8. That is, the mixed sand is discharged from mixer 1 onto disc 12 by opening door 2 and thereafter, as the result of rotation of disc 12, the sand is whirled or rotated, and thrown against studs 27 and angles 17 to break it up and make it fluffy, and finally the sand is tangentially discharged, by the centrifugal force of the rotating disc, through a sealed discharge housing 29 or sand seal which leads to a discharge nozzle or door 21 hinged to the housing by a hinged rod 22 extending through hinges 23. An eye bolt 24 is provided on the discharge nozzle for facilitating manual grasping and raising of the nozzle.

A threaded nut portion 25 rigidly secured on nozzle 21 cooperates with a threaded shaft 26 secured to housing 7 to provide means for adjusting the amount of tilt or opening of discharge nozzle 21 about hinges 23 so as to selectively direct the discharged sand as desired.

When the closure plate or door 2 is in its closed position, as indicated by the full lines in Figure 1, a portion 2a of such door will have passed outwardly through a slot 1a in the wall of the mixer 1. To dispose of sand pushed through the slot 1a, a casing 20 is provided in surrounding relation to slot 1a and provides a passage 20a opening above rotary disk 12, adjacent discharge housing 29.

It will be seen therefore, that I have provided an efficient method and compact device for effectively aerating and fluffing sand or other similar granular material that is lumpy so as to condition it for further use.

It will be perceived that my novel aerating device is in reality a self-contained unit and may be readily attached to any conventional muller having a bottom discharge opening located adjacent the wall of the muller. While my invention is particularly adapted for the treatment of spent foundry sand which is moistened, mulled and re-conditioned in the muller 1, it is to be understood it is equally useful in the treatment of other granular types of material requiring fluffing or aeration of the material.

It will also be perceived that the directional door 21 is of a distinct advantage in that it facilitates the discharge of the material at any angle necessitated by the zone or receptacle into which the material that has been aerated is to be discharged. It is in reality a labor saving device and is of considerable assistance in getting the material into the ultimate location in which it is desired.

It will, of course, be understood that various details of construction may be varied through a wide range without departing from the principles of this invention and it is, therefore, not the purpose to limit the patent granted hereon otherwise than necessitated by the scope of the appended claim.

I claim as my invention:

In an apparatus wherein sand is mulled in a first container and then transferred to a second container for aerating, a control door mounted on one of the containers for slidable opening and closing of a common port between the said containers, said door adapted to be moved partially open for regulating the quantity of sand passing therethrough, and means defining a chamber communicating with the interior of said second container and having an opening communicating with said first container in line with said control door for receiving the leading edge of the control door in its closed position, whereby sand pushed ahead of said door in its movement to its closed position is disposed in said second container.

AXEL G. GRANATH.

REFERENCES CITED

The following references are of record in the file of this patent:

UNITED STATES PATENTS

| Number | Name | Date |
|---|---|---|
| 1,387,380 | Fryer | Aug. 9, 1921 |
| 1,736,054 | Roger | Nov. 19, 1929 |
| 1,880,237 | Christensen | Oct. 4, 1932 |
| 1,959,465 | Dryfoos | May 22, 1934 |
| 2,132,164 | Henry | Oct. 4, 1938 |
| 2,207,884 | Holmen | July 16, 1940 |
| 2,223,018 | Christensen | Nov. 26, 1940 |

FOREIGN PATENTS

| Number | Country | Date |
|---|---|---|
| 631,548 | Germany | June 23, 1936 |
| 754,443 | France | Nov. 7, 1933 |